(12) United States Patent
Anasta et al.

(10) Patent No.: US 11,580,550 B2
(45) Date of Patent: Feb. 14, 2023

(54) PRINTER FOR SELECTIVELY PRINTING SYMBOLIC INFORMATION ON A MEDIUM

(71) Applicant: Capital One Services, LLC, McLean, VA (US)

(72) Inventors: Jude Pierre Anasta, Hudson, NY (US); Tyler Maiman, Melville, NY (US); Abdelkader M'Hamed Benkreira, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/070,532

(22) Filed: Oct. 14, 2020

(65) Prior Publication Data

US 2022/0114592 A1  Apr. 14, 2022

(51) Int. Cl.
*G06Q 20/40* (2012.01)
*G06Q 40/02* (2012.01)

(52) U.S. Cl.
CPC ..... *G06Q 20/4016* (2013.01); *G06Q 20/4012* (2013.01); *G06Q 20/4014* (2013.01); *G06Q 40/025* (2013.01)

(58) Field of Classification Search
CPC ... G06Q 20/40; G06Q 20/385; G06Q 20/4016
USPC .......................................................... 705/44
See application file for complete search history.

(56) References Cited

U.S. PATENT DOCUMENTS

| 5,239,926 | A | * | 8/1993 | Nubson | .................... | B41J 3/407 |
| | | | | | | 15/103.5 |
| 6,182,894 | B1 | | 2/2001 | Hackett et al. | | |
| 8,061,596 | B2 | | 11/2011 | Hogg et al. | | |
| 8,145,549 | B2 | | 3/2012 | Das | | |
| 8,484,132 | B1 | * | 7/2013 | Christiansen | .......... | G06Q 40/00 |
| | | | | | | 705/35 |
| 8,678,288 | B2 | * | 3/2014 | Eng | ........................ | B32B 37/12 |
| | | | | | | 235/487 |

(Continued)

OTHER PUBLICATIONS

E. Saraswathi, et al., "Credit Card Fraud Prediction and Detection using Artificial Neural Network and Self-Organizing Maps," 2019 3rd International Conference on Computing Methodologies and Communication (ICCMC), 2019, pp. 1124-1128, doi: 10.1109/ICCMC.2019.8819 (Year: 2019).*
Ghosh and Reilly, "Credit card fraud detection with a neural-network," 1994 Proceedings of the Twenty-Seventh Hawaii International Conference on System Sciences, 1994, pp. 621-630, doi: 10.1109/HICSS.1994.323314. (Year: 1994).*

(Continued)

*Primary Examiner* — Mike Anderson
*Assistant Examiner* — John O Preston
(74) *Attorney, Agent, or Firm* — Harrity & Harrity, LLP

(57) ABSTRACT

In some implementations, a printing system may include a card printer that includes a printing controller and a marking device. The card printer may be configured to receive a first printing instruction or a second printing instruction associated with printing an account identifier on a card. The card printer may receive one of the first printing instruction or the second printing instruction based on whether a risk score, associated with the account identifier, satisfies a threshold. The card printer may print a full account identifier, associated with the card, on a surface of the card based on receiving the first printing instruction. The card printer may print the card without the full account identifier on the surface of the card based on receiving the second printing instruction.

20 Claims, 7 Drawing Sheets

(56) References Cited

U.S. PATENT DOCUMENTS

| | | | |
|---|---|---|---|
| 9,003,474 B1* | 4/2015 | Smith | G06F 16/00 |
| | | | 715/205 |
| 9,280,880 B1 | 3/2016 | Bremer et al. | |
| 10,445,731 B1* | 10/2019 | Dodds-Brown | G06Q 20/385 |
| 2007/0022027 A1* | 1/2007 | Gupta | G06N 20/00 |
| | | | 707/999.1 |
| 2007/0164101 A1* | 7/2007 | Meyerhofer | G07F 17/32 |
| | | | 235/432 |
| 2007/0246526 A1* | 10/2007 | Elgar | G06F 16/381 |
| | | | 707/E17.096 |
| 2008/0000965 A1* | 1/2008 | Zellner | G06F 16/951 |
| | | | 235/380 |
| 2009/0222897 A1* | 9/2009 | Carow | H04L 63/083 |
| | | | 707/999.107 |
| 2010/0116879 A1* | 5/2010 | Lourenco | G07F 7/0806 |
| | | | 235/487 |
| 2015/0332184 A1* | 11/2015 | Osborn | G06Q 10/00 |
| | | | 705/7.28 |
| 2019/0340484 A1 | 11/2019 | Mullen et al. | |

OTHER PUBLICATIONS

S. von Solms, "An investigation into credit card information disclosure through Point of Sale purchases," 2015 Information Security for South Africa (ISSA), 2015, pp. 1-8, doi: 10.1109/ISSA.2015.7335055. (Year: 2015).*

International Search Report and Written Opinion for Application No. PCT/US2021/055031, dated Feb. 1, 2022, 11 pages.

* cited by examiner

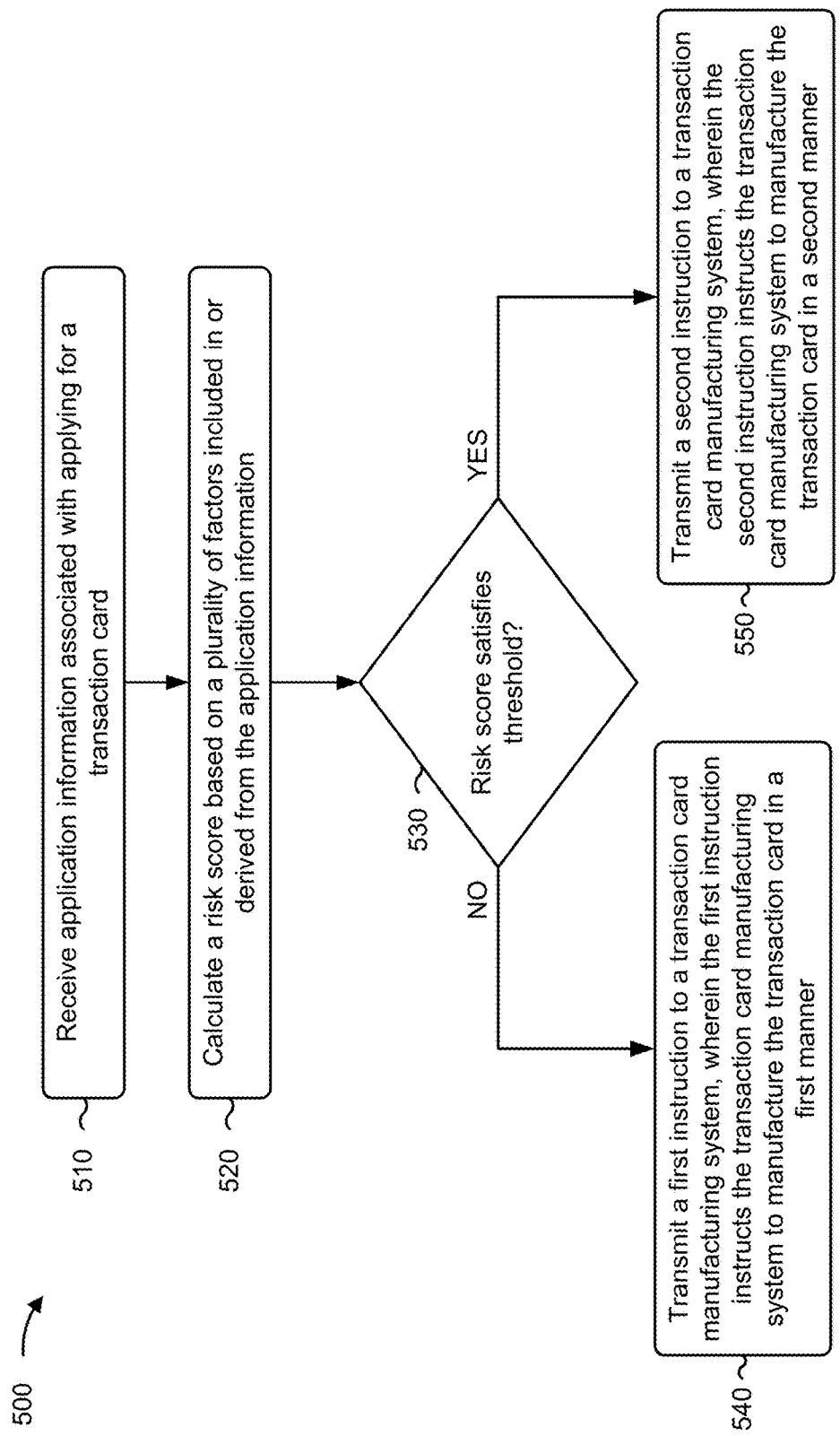

PRINTER FOR SELECTIVELY PRINTING SYMBOLIC INFORMATION ON A MEDIUM

BACKGROUND

A manufacturing system may produce information on a transaction card. For example, a manufacturing system may print, emboss, layer, or laminate information that identifies an account associated with the transaction card, an entity associated with the account, or an issuing entity associated with the transaction card.

SUMMARY

In some implementations, a printing system includes a device configured to determine a score associated with an account identifier to be printed on a card. The device may be configured to transmit either a first printing instruction or a second printing instruction based on a determination of whether the score satisfies a threshold. The printing system may include a card printer that includes a printing controller and a marking device. The card printer may be configured to receive, by the printing controller and from the device, the first printing instruction or the second printing instruction associated with printing the account identifier on the card. The card printer may be configured to print a full account identifier, associated with the card, on a surface of the card based on receiving the first printing instruction. The card printer may be configured to print the card without the full account identifier on the surface of the card based on receiving the second printing instruction. In some implementations, at least one of the first printing instruction or the second printing instruction is received, by printing controller and from the device, based on whether the score satisfies the threshold. The card printer may be configured to print, using the marking device, the card with the full account identifier or without the full account identifier based on whether the first printing instruction or the second printing instruction is received by the printing controller.

In some implementations, a method includes receiving, by a device, credit application information associated with applying for a transaction card. The method may include determining, by the device, a risk score based on the credit application information, where the risk score indicates a risk that an account identifier associated with the transaction card will be stolen. The method may include transmitting, by the device, either a first instruction or a second instruction to a transaction card printing system based on a determination of whether the risk score satisfies a threshold. The first instruction may instruct the transaction card printing system to print a full account identifier, associated with the transaction card, on a surface of the transaction card. The second instruction may instruct the transaction card printing system to print the transaction card without the full account identifier on the surface of the transaction card.

In some implementations, a non-transitory computer-readable medium storing a set of instructions includes one or more instructions that, when executed by one or more processors of a device, cause the device to receive application information associated with applying for a transaction card. The one or more instructions may cause the device to calculate a risk score based on a plurality of factors included in or derived from the application information, where the risk score indicates a likelihood that an account identifier of an account associated with the transaction card will be used for a fraudulent transaction. The one or more instructions may cause the device to determine whether the risk score satisfies a threshold. The one or more instructions may cause the device to transmit one of a first instruction or a second instruction to a transaction card manufacturing system based on whether the risk score satisfies the threshold, where the first instruction instructs the transaction card manufacturing system to manufacture the transaction card in a first manner, and where the second instruction instructs the transaction card manufacturing system to manufacture the transaction card in a second manner, where the second manner is different from the first manner.

BRIEF DESCRIPTION OF THE DRAWINGS

FIG. 5 is a flowchart of an example process relating to selectively printing symbolic information on a medium.

DETAILED DESCRIPTION

Figure 1A:
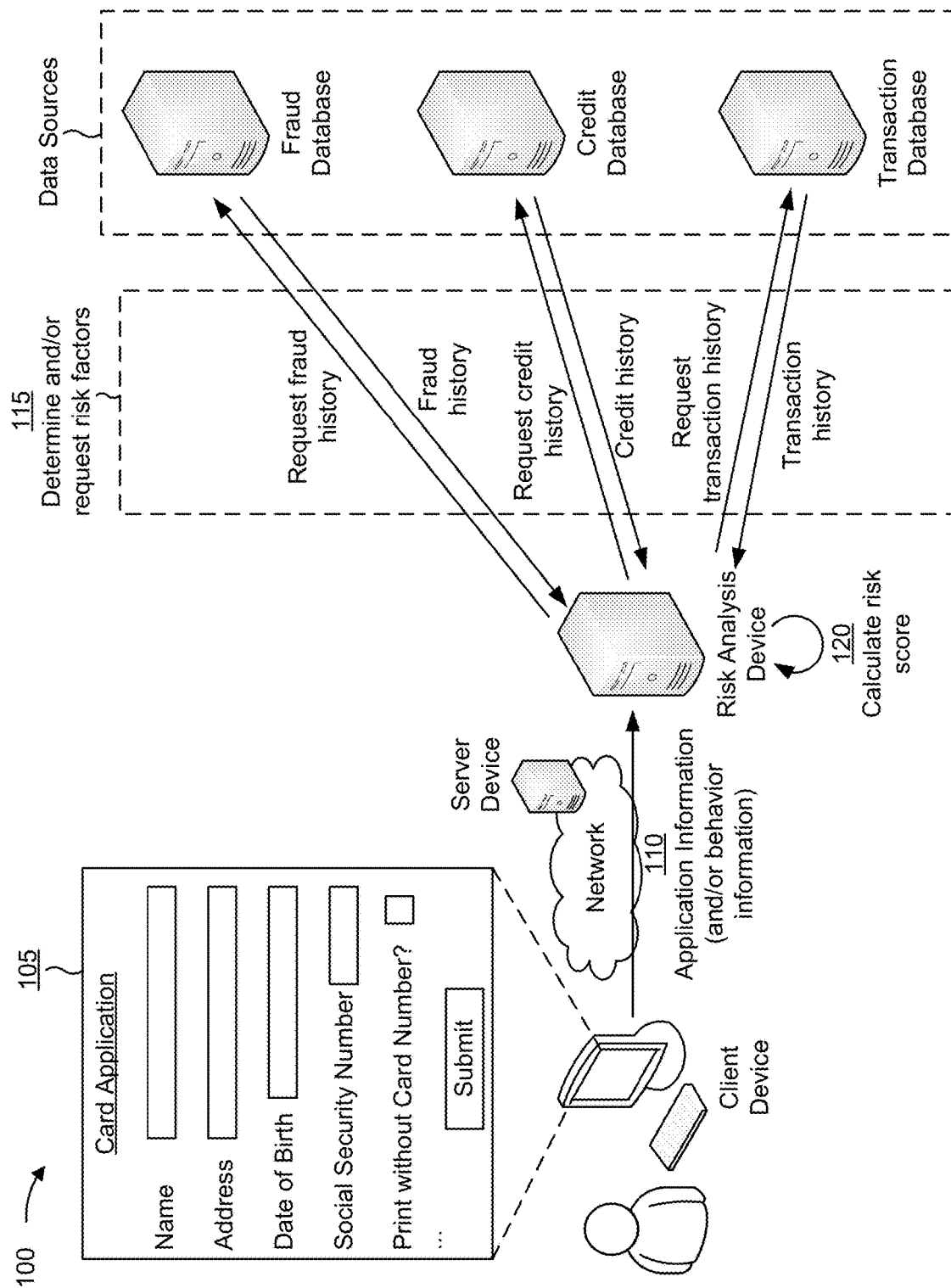
FIGS. 1A-1C are diagrams of an example implementation relating to selectively printing symbolic information on a medium.

The following detailed description of example implementations refers to the accompanying drawings. The same reference numbers in different drawings may identify the same or similar elements.

A transaction card, such as a credit card, a debit card, a gift card, or a stored-value card, may have information printed on a surface of the transaction card. The information may include an account identifier (such as a payment account number, a payment card number, or a primary account number) that identifies an account associated with the transaction card, an expiration date of the transaction card, security information (such as a card security code (CSC), a card verification number, a card verification value (CVV), or a card verification code (CVC)), and/or a name of an entity (e.g., an individual or a business) associated with the card, among other examples. The information printed on the transaction card may enable an entity to complete transactions using the transaction card, such as when an account identifier or other information is manually input into a transaction terminal, via a website, or via an application to perform a transaction.

In some cases, fraudulent actors may obtain the information printed on the transaction card. For example, a fraudulent actor may obtain the information by looking at the transaction card, capturing an image of the transaction card that shows the information, or making a physical impression of a surface of the transaction card (e.g., that includes embossed digits), among other examples. Once the fraudulent actor obtains the information printed on the transaction card, the fraudulent actor may use the information to perform fraudulent activities (e.g., the fraudulent actor may perform fraudulent transactions or may produce fraudulent transaction cards). These fraudulent activities may negatively impact both the entity associated with the transaction card and the issuer of the transaction card. The entity associated with the transaction card may be liable for transactions that arose through the fraudulent actor and may attempt to identify and remedy the fraudulent transactions.

This may waste computing resources that are used to attempt to identify and remedy the fraudulent activity. The issuer of the transaction card may also be negatively impacted and waste computing resources associated with attempting to reverse the fraudulent activity for the user, along with attempting to identify, detect, and diagnose the fraudulent activity.

To reduce fraud, a transaction card could be manufactured so that the full account identifier is not printed on the surface of the transaction card. However, this could result in a poor user experience or the inability to execute a transaction because a user may need to be able to access the full account identifier to input the full account identifier via web page (e.g., for a purchase) or read the full account identifier over the phone for a legitimate transaction.

Some implementations described herein enable a transaction card manufacturing system to selectively print information on a transaction card, such as an account identifier or other information. For example, a device may determine a risk score (e.g., a score that indicates a risk that an account identifier associated with the transaction card will be stolen and/or used in an unauthorized transaction) based on credit application information for a transaction card. The device may determine whether the risk score satisfies a threshold. If the risk score satisfies the threshold, the device may transmit a first instruction, to a transaction card manufacturing system, that instructs the transaction card manufacturing system to print a full account identifier (e.g., card identifier, expiration date, security information, and/or an entity name), associated with the transaction card, on a surface of the transaction card. If the risk score does not satisfy the threshold, the device may transmit a second instruction, to a transaction card manufacturing system, that instructs the transaction card manufacturing system to print the transaction card without the full account identifier on the surface of the transaction card.

As a result, if the risk score indicates a high risk that an account identifier associated with the transaction card will be stolen, the transaction card manufacturing system may manufacture the transaction card without a full account identifier. Therefore, fraudulent actors may be unable to obtain the full account identifier of the transaction card by observing the transaction card. As a result, the entity associated with the transaction card may conserve computing resources that would have otherwise been used attempting to identify and remedy fraudulent activity. Additionally, the issuer of the transaction card may conserve computing resources that would have otherwise been used attempting to reverse the fraudulent activity for the user, along with attempting to identify, detect, and diagnose the fraudulent activity.

If the risk score indicates a low risk that an account identifier associated with the transaction card will be stolen, the transaction card manufacturing system may manufacture the transaction card with the full account identifier. This improves usability of the transaction card by allowing a cardholder to easily observe and the full account identifier for a transaction. Without this information on the surface of the card, the cardholder may otherwise need to use computing resources to look up the account identifier. Printing the full account identifier on the transaction card conserves these computing resources. Thus, some implementations described herein provide an appropriate tradeoff between reducing fraudulent activity for high risk accounts and improving usability for low risk accounts.

Figure 1B:
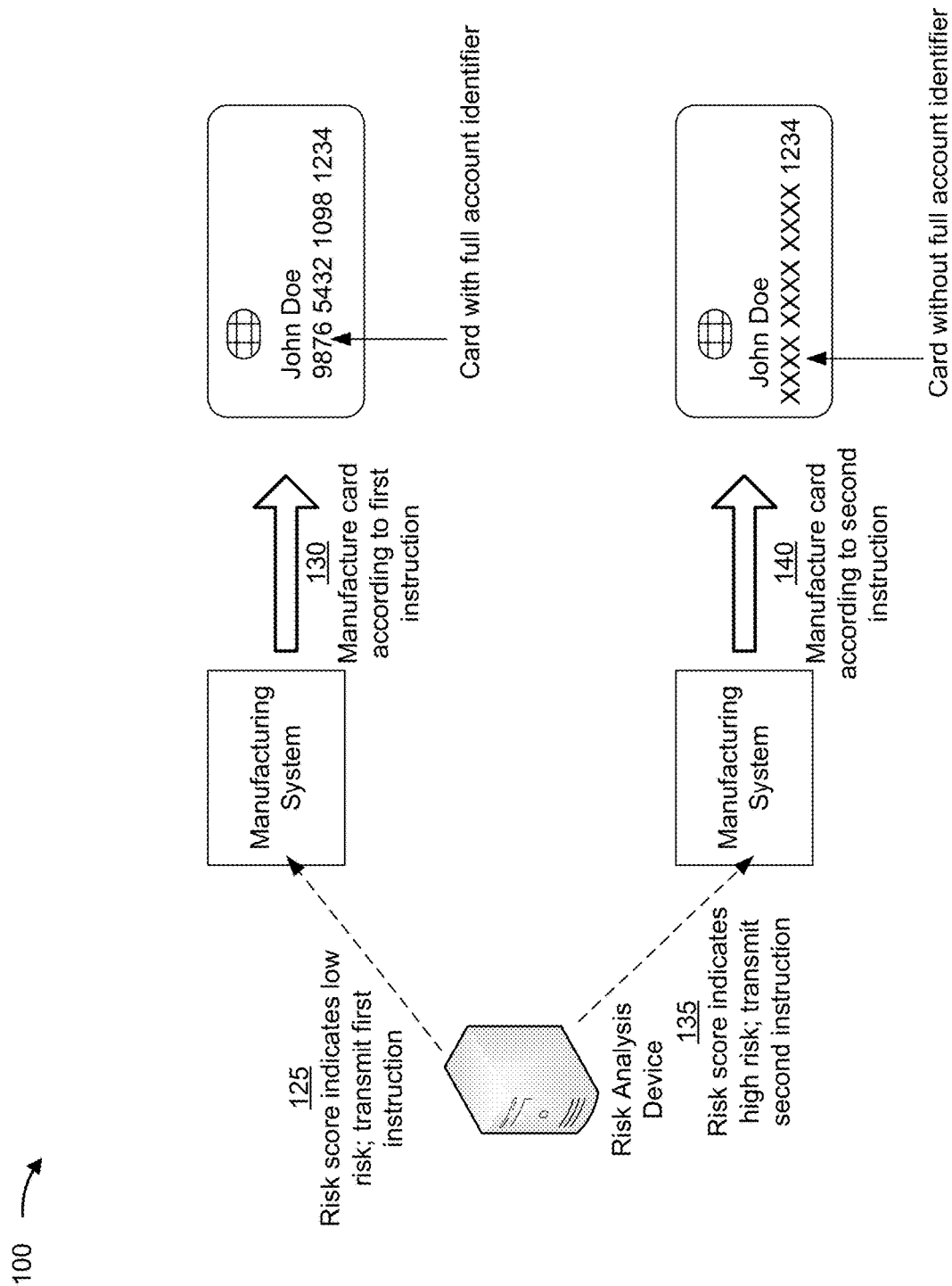
Figure 1C:
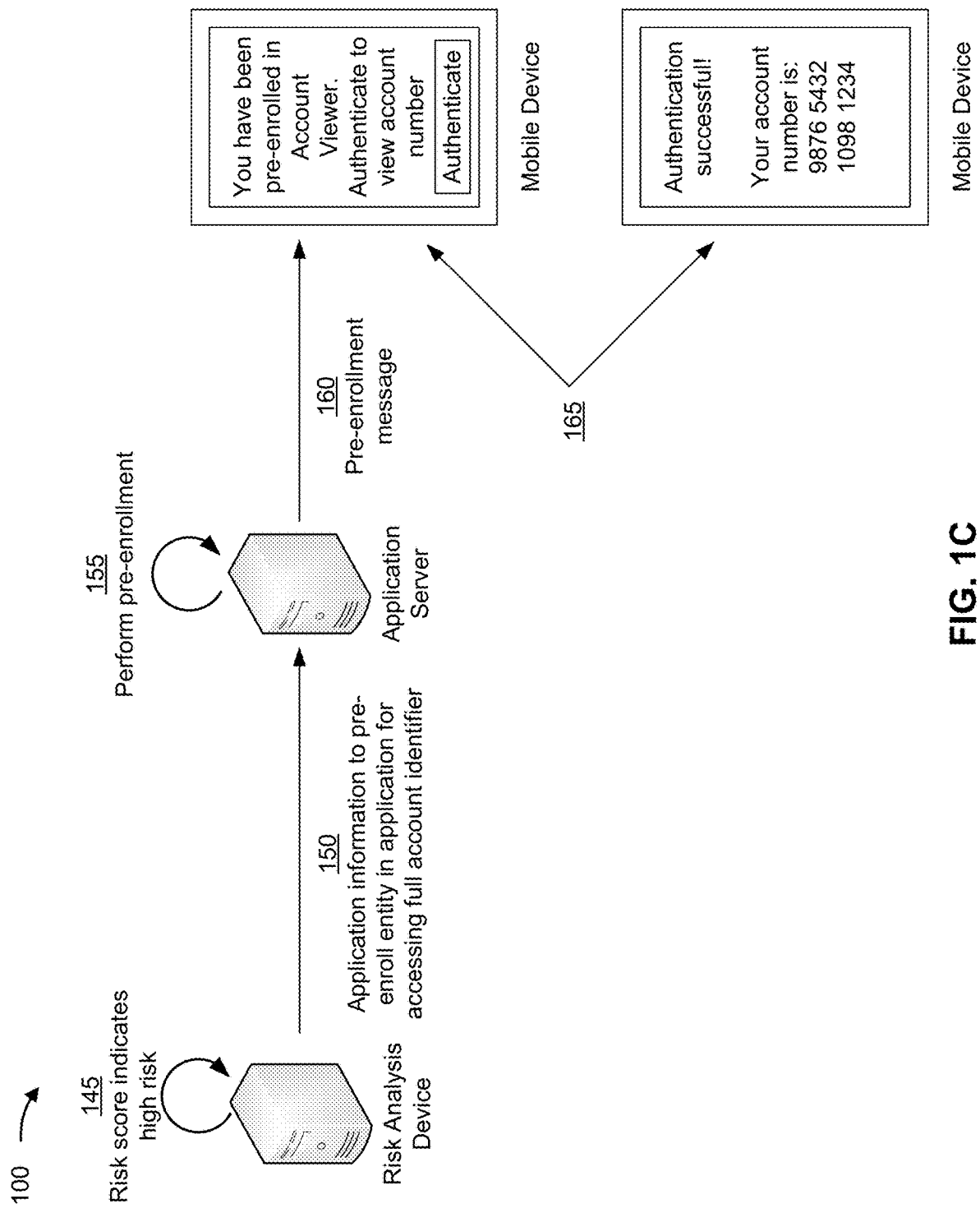

FIGS. 1A-1C are diagrams of an example 100 associated with selectively printing symbolic information on a medium.

As shown in FIGS. 1A-1C, example 100 includes a risk analysis device, a manufacturing system that receives instructions from the risk analysis device, and a client device for obtaining card application information and providing the card application information to the risk analysis device. These devices are described in more detail in connection with FIG. 3.

As shown by reference number 105, a user may use a client device to apply for a transaction card. For example, the user may use the client device to interact with (e.g., view, fill, or complete) an application form. The application form may be a credit application form for a service provided by an entity that is associated with the risk analysis device. The application form may be provided to the client device by the risk analysis device or a web server in communication with the risk analysis device. The application form may be viewed on the client device via a webpage or an application, among other examples.

The user may interact with the client device to input application information into the application form. The application information may include a name of the user, geographic information associated with the user (e.g., an address, a city, a state, and/or a postal code, among other examples), a date of birth of the user, or a social security number of the user, among other examples. In some implementations, the application form may include a field for the user to input an indication to manufacture the transaction card, that is to be created if the credit application is approved, without a full account identifier (e.g., without a full card number, without a full expiration date, or without full security information).

As shown by reference number 110, the client device may transmit the application information (and/or behavior information associated with a manner in which the application information is input to the client device, as described in more detail elsewhere herein) to the risk analysis device. Additionally, or alternatively, the client device may provide device information to the risk analysis device, such as a network address (e.g., an Internet protocol (IP) address) of the client device. In some implementations, the risk analysis device may derive geographic information or other information based on the device information. For example, the risk analysis device may derive geographic information (e.g., an area code, geographic coordinates, a zip code, or a postal code) associated with the client device from the network address of the client device.

As shown by reference number 115, the risk analysis device may determine and/or request a set of risk factors associated with the application information. The set of risk factors may include, for example, a fraud history of the user, a credit history of the user, and/or a transaction history of the user, and may be used to calculate a risk score. The client device may use the application information to derive the set of risk factors. For example, the risk analysis device may request the set of risk factors from one or more data sources by transmitting application information to the one or more data sources. Additionally, or alternatively, the risk analysis device may obtain the set of risk factors from memory of the risk analysis device based on the application information.

For example, the risk analysis device may request a fraud history of the user from a fraud database, such as by transmitting application information that identifies the user (e.g., a name, an address, a social security number, and/or a date of birth) in the request. The fraud database may identify fraud history information associated with the user (e.g., by using the application information to look up the fraud history information), and may transmit the fraud history information to the risk analysis device. The fraud history information may indicate if the user has previously been a victim of fraud (e.g., if the user has previously had a transaction card account identifier information stolen), a number of times that the user has previously been a victim of fraud, and/or a type of fraud to which the user has been a victim (e.g., physical transaction card stolen, personal information stolen, or account identifier information stolen from a transaction card), among other examples.

Additionally, or alternatively, the risk analysis device may request a credit history of the user from a credit database, such as by transmitting application information that identifies the user in the request. The credit database may identify credit history information associated with the user in a similar manner as described above, and may transmit the credit history information to the risk analysis device. The credit history information may indicate a credit score of the user, a number of credit accounts associated with the user, an amount of time one or more credit accounts associated with the user have been open, a frequency of use of one or more credit accounts associated with the user, whether one or more credit accounts have been closed, an entity that closed one or more credit accounts, and/or an amount of debt associated with one or more credit accounts associated with the user, among other examples.

Additionally, or alternatively, the risk analysis device may request a transaction history of the user from a transaction database, such as by transmitting application information that identifies the user in the request. The transaction database may identify transaction history information associated with the user in a similar manner as described above, and may transmit the transaction history information to the risk analysis device. The transaction history information may indicate a set of merchants with which transactions were made by the user (e.g., using an account or a card of the user), a set of items purchased in one or more transactions, or whether a physical transaction card was present (e.g., card-present transactions) or not present (e.g., card-not-present transactions) for one or more transactions, among other examples.

As shown by reference number 120, the risk analysis device may calculate a risk score based on the set of risk factors. The risk score may indicate a likelihood that an account identifier of an account associated with a transaction card will be used for a fraudulent transaction. As used herein, the risk score, a likelihood that an account identifier of an account associated with a transaction card will be used for a fraudulent transaction, a likelihood that an account identifier of an account associated with a transaction card will be stolen, a risk of fraud, a likelihood of fraud, or the like may refer to a likelihood that a fraudulent actor will obtain an account identifier or other sensitive information (e.g., a name, an expiration date, or security information) of a transaction card from the information printed on the physical medium of the transaction card, such as a surface or a face of the transaction card (e.g., by looking at the transaction card, by capturing an image of the transaction card, or by other means).

The risk analysis device may determine the risk score based on the fraud history information, the credit history information, the transaction history information, and/or a geographic region associated with the entity applying for the transaction card, among other examples. As used herein, a higher risk score indicates a higher likelihood of fraud, whereas a lower risk score indicates a lower likelihood of fraud. Some example are described below that use "high" or "higher" numbers and "low" or "lower" numbers. As used herein, a "high number" or a "higher number" may refer to a number, a percentage, or a ratio satisfying a threshold (e.g., being greater than a threshold, or greater than or equal to the threshold). Conversely, a "low number" or a "lower number" may refer to a number, a percentage, or a ratio failing to satisfy a threshold (e.g., being less than a threshold, or less than or equal to the threshold).

In some implementations, the risk score may be calculated based on whether the entity applying for credit has previously been a victim of fraud and/or a number of times that the entity applying for credit has previously been a victim of fraud. For example, if the fraud history of the entity applying for the transaction card indicates that the entity has previously been a victim of fraud, then the risk analysis device may calculate a higher risk score for the entity than if the entity had not previously been a victim of fraud). As another example, the risk analysis device may calculate a higher risk score for an entity that has been a victim of fraud a greater number of times as compared to an entity that has been a victim of fraud a lesser number of times.

Additionally, or alternatively, the risk score may be calculated based on a number of credit accounts currently open by the entity applying for credit and/or an age of the entity's credit accounts (e.g., an average age, an age of an oldest account, and/or an age of a newest account). For example, if an entity has a high number of credit accounts open (e.g., that satisfies a threshold), the risk analysis device may calculate a lower risk score because the entity is experienced in protecting account information of credit accounts (e.g., assuming the entity has not been a victim of fraud). As another example, if an age of the entity's credit is low (e.g., if an oldest credit account of the entity was opened relatively recently, if the entity has never opened a credit account before, or if the entity has a low average age of credit accounts), then the risk analysis device may calculate a higher risk score because the entity is not experienced in protecting account information of credit accounts (e.g., as compared to an entity with a high average age of credit accounts).

Additionally, or alternatively, the risk score may be calculated based on a number of transactions performed using credit accounts of the entity and/or one or more types of the transactions (e.g., card-present or card-not-present). For example, if the transaction history information indicates that the entity has a higher number of transactions, the risk analysis device may calculate a higher risk score (e.g., due to the increased number of opportunities for the account identifier to be stolen) as compared to an entity with a lower number of transactions. In some implementations, the risk analysis device may determine the risk score based on types of transactions indicated by the transaction history information. Card-present transactions may have a higher risk for fraud than card-not-present transactions because a fraudulent actor has an opportunity to see, or capture information from, the transaction card during card-present transactions. Thus, if the transaction history information indicates a higher number of card-present transactions (e.g., a number, percentage, or ratio that satisfies a threshold), the risk analysis device may calculate a higher risk score as compared to a lower number of card-present transactions. Thus, the risk score may be calculated based on a number of card-present transactions, a percentage of card-present transactions (e.g., out of all total transactions measured for a time period), and/or a ratio of card-present transactions to card-not-present transactions.

Additionally, or alternatively, the risk score may be based on merchants, merchant categories, items, and/or item categories associated with transactions performed using credit accounts of the entity. For example, merchants that use a transaction terminal that is out of a cardholder's view (e.g., where a third party, such as an employee of the merchant, takes the transaction card to a transaction terminal in a different room to complete a transaction), such as some restaurants, may be associated with a higher risk of fraud as compared to merchants that use a transaction terminal in view of the cardholder, such as some grocery stores. Therefore, if the transaction history information indicates a high number (e.g., a number, percentage, or ratio that satisfies a threshold) of transactions at merchants in a particular merchant category (e.g., restaurants), the risk analysis device may calculate a higher risk score as compared to a low number of transactions at merchants in the particular merchant category. Similarly, in-person merchants may be associated with a higher risk for an account identifier of a transaction card being stolen than online merchants as an entity may not be required to produce a physical transaction card for an online merchant.

In some implementations, payment terminals that require an entity to swipe or produce a physical transaction card may be associated with a higher risk of fraud than contactless transaction terminals. For example, a transaction terminal that does not require an entity to swipe or insert a physical transaction card may not give a fraudulent actor an opportunity to see, or otherwise capture, the information printed on the transaction card. Therefore, if the transaction history information indicates that the entity executes transactions at a high number of contactless transaction terminals, the risk analysis device may calculate a lower risk score as compared to an entity that executes transactions at a high number of non-contactless transaction terminals.

In some implementations, the risk analysis device may calculate the risk score based on a geographic region included in the credit application information, associated with an entity applying for the transaction card, and/or associated with a network address of the client device used to apply for the transaction card. Certain geographic regions may be associated with a higher number of instances of fraud. Therefore, if the entity applying for the transaction card is associated with a geographic region that is associated with a higher number of instances of fraud, the risk analysis device may determine that the entity is at a higher risk for an account identifier of a transaction card being stolen. In some implementations, the risk analysis device or another database may store a data structure that indicates fraud risks for different geographic regions, such as by using a Boolean value for different sets of geographic regions (e.g., indicating high risk or low risk of fraud) and/or a fraud score for different geographic regions or sets of geographic regions.

In some implementations, the risk analysis device may determine the risk score based on behavior information that indicates user behavior associated with inputting data into the application form using the client device. For example, using a virtual private network, providing input via only a keyboard (e.g., indicative of executing a macro or script), copying and pasting information in one or more fields or a particular set of fields, among other examples, may be actions indicative of fraud and may cause the risk analysis device to calculate a higher risk score. Additionally, or alternatively, an internet service provider (ISP) obtained from the client device information may be compared against a list of ISPs that are known to be commonly correlated with fraud. If the ISP matches an ISP on the list, the risk analysis device may determine that the device information is indicative of fraud.

In some implementations, the risk analysis device may determine, based on the credit application information, whether the entity applying for the transaction card has an account with an institution (e.g., a financial institution or an issuer of the transaction card) associated with the transaction card. In some implementations, if the risk analysis device determines that the entity applying for the transaction card has an account with the institution associated with the transaction card, the risk analysis device may apply a first model (e.g., a first set of risk factors) to the credit application information to determine the risk score. If the risk analysis device determines that the entity applying for the transaction card does not have an account with the institution associated with the transaction card, the risk analysis device may apply a second model (e.g., a second set of risk factors) to the credit application information to determine the risk score. In some implementations, if the entity already has an account with the institution associated with the transaction card, the risk analysis device may apply information associated with that account to determine the risk score (e.g., transaction history information). In some implementations, the second model may use a different set of factors and/or may apply a different weight (than the first model) to one or more risk factors. For example, the second model may apply a higher weight to behavior information than the first model. In this way, the risk analysis device may improve an accuracy of the risk score for entities that have an account with the institution associated with the transaction card.

In some implementations, the risk analysis device may use machine learning to determine the risk score. For example, the risk analysis device may use machine learning to determine whether a risk factor is indicative of a likelihood that account identifier information will be stolen from a transaction card or may use machine learning to determine a weight to be applied to the risk factor, among other examples. Example machine learning techniques used to determine the risk score are described below in more detail in connection with FIG. 2.

As shown in FIG. 1B, the risk analysis device may determine whether the risk score indicates a high risk or a low risk that an account identifier associated with the transaction card will be stolen. For example, the risk analysis device may determine whether the risk score satisfies a threshold. In some implementations, the threshold may be based on credit history information associated with the entity applying for the transaction card. For example, if the entity has relatively good credit history (e.g., a high credit score or a high age of credit) the threshold may be a first (e.g., higher) threshold. If the entity has relatively poor credit (e.g., a low credit score or a low age of credit) the threshold may be a second (e.g., lower) threshold. In some implementations, the threshold may be based on whether the entity applying for the transaction card has an account with the institution associated with the transaction card. In some implementations, the risk analysis device may determine the threshold using machine learning, as described below in connection with FIG. 2.

In some implementations, the risk analysis device may determine if the application for the transaction card is approved. Alternatively, another device (such as an application server) associated with the institution associated with the transaction card may determine if the application for the transaction card is approved. An account associated with the entity applying for the transaction card may be created or generated if the application is approved. The risk analysis device may determine (or receive an indication of) account identifier information associated with the account that is created.

As shown by reference number 125, if the risk score indicates a low risk (e.g., that does not satisfy a threshold), then the risk analysis device may transmit a first instruction to a transaction card manufacturing system (shown as "Manufacturing System" and sometimes referred to herein as a manufacturing system). As shown by reference number 130, the manufacturing system may manufacture (e.g., print, emboss, layer, or laminate) the transaction card according to the first instruction. In example 100 of FIG. 1B, the first instruction instructs the manufacturing system to manufacture the transaction card by printing the transaction card with the full account identifier information, shown as a full account number or transaction card number. In some examples, the first instruction may instruct the manufacturing system to manufacture the transaction card with a full card number, with a full expiration date, and/or with full security information (e.g., a full CVV).

As shown by reference number 135, if the risk score indicates a high risk (e.g., that satisfies a threshold), then the risk analysis device may transmit a second instruction (e.g., different form the first instruction) to the manufacturing system. As shown by reference number 140, the manufacturing system may manufacture the transaction card according to the second instruction. In example 100 of FIG. 1B, the second instruction instructs the manufacturing system to manufacture the transaction card by printing the transaction card without the full account identifier information (e.g., without any digits or characters of a full account identifier, or with only a portion of the digits or characters of a full account identifier). In some examples, the second instruction may instruct the manufacturing system to manufacture the transaction card without a full card number, without a full expiration date, and/or without full security information, such as by manufacturing the transaction card without any characters of these values or by manufacturing the transaction card with only a portion of the characters of these values.

In some implementations, the risk analysis device may transmit the first instruction or the second instruction to the same manufacturing system regardless of whether the risk analysis device determines to transmit the first instruction or the second instruction. Alternatively, the risk analysis device may determine a manufacturing system to which the instruction is to be transmitted based on which instruction the risk analysis device determines to transmit. For example, the risk analysis device may transmit the first instruction to a first manufacturing system configured to manufacture the transaction card according to the first instruction. The risk analysis device may transmit the second instruction to a second manufacturing system configured to manufacture the transaction card according to the second instruction.

While some implementations are described herein using the terms "print" or "printing," the manufacturing system may manufacture the transaction card according to one or more manufacturing techniques, such as printing (e.g., thermo printing, laser printing, ink jet printing, or re-transfer printing), laminating, embossing, or layering. Therefore, as used herein, manufacturing the transaction card by the manufacturing system may refer to, but is not limited to, one or more of the manufacturing techniques described above.

In some implementations, the second instruction may instruct the manufacturing system to manufacture a portion of the full account identifier information. For example, the second instruction may instruct the manufacturing system to replace one or more characters or numbers of the full account identifier information with a different character or symbol. For example, a card number of a transaction card may be 16 digits. The second instruction may instruct the manufacturing system to manufacture one or more of the digits as a character or a symbol (such as "x," "X," "*," "-," ".," or "●") and the remaining digits as the digits of the card number. For example, if a card number is 9876 5432 1098 1234, then the second instruction may instruct the manufacturing system to manufacture the transaction card with a card number of XXXX XXXX XXXX 1234, ------------ 1234, or ●●●● ●●●● ●●●● 1234. In some implementations, the second instruction may instruct the manufacturing system to manufacture only a portion of the full account information (e.g., and not print the remaining portion of the full account information, rather than replacing it with different characters or symbols). While examples herein are described and shown having 4 characters of a card number manufactured on a transaction card, the second instruction may cause more or less characters (or may cause no characters) of a card number to be manufactured on a transaction card.

In some implementations, the second instruction may instruct the manufacturing system to manufacture the transaction card with words and/or characters replacing a portion of the account identifier information. For example, if the card number is 9876 5432 1098 1234, the second instruction may instruct the manufacturing system to manufacture the transaction card with a card number of "Card ending in 1234." This may increase the difficulty of obtaining the full account identifier information because a number of characters included in the full account identifier information is not indicated on the surface of the transaction card.

In some implementations, the second instruction may instruct the manufacturing system to manufacture a full card number associated with the transaction card, but not other account identifier information associated with the transaction card. For example, the second instruction may instruct the manufacturing system to manufacture the transaction card with a full card number, but no (or a partial) expiration date (e.g., manufacturing the transaction card with no expiration date, with only the year of expiration, or with only the month of expiration). Additionally, or alternatively, the second instruction may instruct the manufacturing system to manufacture the transaction card with a full card number, but no (or partial) security information associated with the transaction card (e.g., no digits or fewer than all digits of a CVV or other security code).

In some implementations, the second instruction may instruct the manufacturing system to manufacture the transaction card in a manner that increases the difficulty for a fraudulent actor to read or otherwise obtain the account identifier information from the surface of the transaction card. For example, the first instruction may instruct the manufacturing system to manufacture the transaction card according to a first manufacturing technique (e.g., with embossing), and the second instruction may instruct the manufacturing system to manufacture the transaction card according to a second manufacturing technique (e.g., without embossing) that is different than the first manufacturing technique. For example, the first instruction and the second instruction may instruct the manufacturing system to manufacture the transaction card with full account identifier information, but the second instruction may instruct the manufacturing system to manufacture the transaction card according to a technique that increases the difficulty for a fraudulent actor to read or otherwise obtain the account identifier information from the surface of the transaction card. In some implementations, the second instruction may instruct the manufacturing system to manufacture the transaction card without full account identifier information and according to a technique that increases the difficulty for a fraudulent actor to read or otherwise obtain the account identifier information from the surface of the transaction card.

In some implementations, the first instruction may instruct the manufacturing system to manufacture the transaction card with raised numbers and/or characters on the medium of the transaction card (e.g., using embossing). The second instruction may instruct the manufacturing system to manufacture the transaction card without raised numbers and/or characters (e.g., flat numbers and/or flat characters) on the medium of the transaction card (e.g., without embossing). The flat numbers and/or characters may be more difficult for a fraudulent actor to read or otherwise obtain (e.g., by making it more difficult to obtain using a physical impression of the numbers and/or characters).

In some implementations, the second instruction may instruct the manufacturing system to manufacture the transaction card with a smaller character size or font size than a character size or font size indicated by the first instruction. In some implementations, the second instruction may instruct the manufacturing system to manufacture the transaction card using a reflective ink or marking (e.g., which may not be used according to the first instruction), thereby increasing the difficulty to read or otherwise obtain the account identifier information from the surface of the transaction card. In some implementations, the second instruction may instruct the manufacturing system to manufacture the transaction card using a lower contrast level than a contrast level indicated by the first instruction.

In some implementations, the second instruction may instruct the manufacturing system to manufacture the transaction card using a different medium than a medium indicated by the first instruction. For example, certain manufacturing techniques that increase the difficulty to read or otherwise obtain the account identifier information from the surface of the transaction card may require, or may produce better results with, certain mediums (such as metal). However, these mediums may increase a cost associated with manufacturing the transaction card. Therefore, the first instruction may instruct the manufacturing system to manufacture the transaction card using a less expensive medium (such as plastic), thereby reducing a cost associated with manufacturing the transaction card.

In some implementations, an input from an entity applying for the transaction card may override a determination by the risk analysis device to transmit the first instruction. For example, the entity applying for the transaction card may input an indication (such as in the application form described above with respect to reference number 105) to manufacture the transaction card without full account identifier information. If the risk analysis device determines that the entity applying for the transaction card has provided an input indicating to manufacture the transaction card without full account identifier information, the risk analysis device may transmit the second instruction to the manufacturing system (e.g., even if the risk analysis device determines that the risk score indicates a low level of risk). In some implementations, the user may provide input in the application form indicating a single character to be printed in place of each character or digit of the account identifier information that is not printed, or may input a string of characters to be printed in place of a set of characters or digits of the account identifier information that is not printed. In this case, the risk analysis device may transmit the single character or string of characters to the manufacturing system, along with the second instruction, to cause the manufacturing system to print the transaction card accordingly.

In some implementations, the risk analysis device may compare the risk score to more than one threshold. For example, if a risk score satisfies a first (e.g., higher) threshold, then the risk score may indicate a high level of risk. If a risk score does not satisfy the first threshold, but satisfies a second (e.g., lower) threshold, then the risk score may indicate a medium level of risk. If the risk score does not satisfy the first threshold and does not satisfy the second threshold, then the risk score may indicate a low level of risk.

In some implementations, the risk analysis device may transmit a first instruction if the risk score indicates a low level of risk, may transmit a second instruction if the risk level indicates a medium level of risk, or may transmit a third instruction if the risk score indicates a high level of risk. The different instructions may indicate different manufacturing techniques to be used to manufacture the transaction card. For example, the first instruction may instruct the manufacturing system to manufacture the transaction card with full account identifier information. The second instruction may instruct the manufacturing system to manufacture the transaction card with full account identifier information and according to a technique that increases the difficulty for a fraudulent actor to read or otherwise obtain the account identifier information from the surface of the transaction card, as described above. The third instruction may instruct the manufacturing system to manufacture the transaction card without full account identifier information (e.g., with partial account identifier information or no account identifier information) and according to a technique that increases the difficulty for a fraudulent actor to read or otherwise obtain the account identifier information from the surface of the transaction card. These manufacturing techniques are provided as examples, and any manufacturing techniques or combination of manufacturing techniques described herein may be used.

As shown in FIG. 1C, in some implementations, full account information may be available to an entity associated with a transaction card via another source, such as a webpage or an application (referred to herein as an "account application"). For example, an entity may be enabled to set up an account with, or enroll in, an account application associated with the institution that issued the transaction card to access the full account identifier information associated with the transaction card. As shown by reference number 145, the risk analysis device may determine that a risk score indicates high risk, as described above. As shown by reference number 150, the risk analysis device may transmit, to an application server, the application information (described above in connection with FIG. 1A) to pre-enroll the entity in the account application. As shown by reference number 155, the application server may perform pre-enrollment for the account application. For example, the application server may create an account for the entity, to enable access to the account application (e.g., after authentication), using the application information provided by the entity when applying for the transaction card.

As shown by reference number 160, the application server may transmit a pre-enrollment message to a mobile device associated with the entity applying for the transaction card.

The message may assist the entity with enrolling in the account using the mobile device. For example, as shown by reference number 165, the message may request that the entity provide authentication information (such as a birth date, a portion of a social security number, or biometric information) to finalize enrollment for the account application. The entity may use the mobile device to provide the authentication information (e.g., the mobile device may transmit a message to the application server indicating the authentication information). The application server may authenticate the entity by comparing the authentication information to information provided by the entity in the application information. If the application server determines that the authentication information matches the information provided by the entity in the application information, the application server may transmit a message (e.g., an authentication successful message) to the mobile device that enables the entity to access the full account identifier information associated with the transaction card using the mobile device. In this way, the risk analysis device may cause an entity that may not have full account information manufactured on a transaction card to be automatically pre-enrolled in a program (e.g., an account application) that enables the entity to access the full account identifier information associated with the transaction card. This conserves computing resources that would have otherwise been used by the entity searching for and enrolling in the program that enables the entity to access the full account identifier information.

As indicated above, FIGS. 1A-1C are provided as an example. Other examples may differ from what is described with regard to FIGS. 1A-1C.

Figure 2:
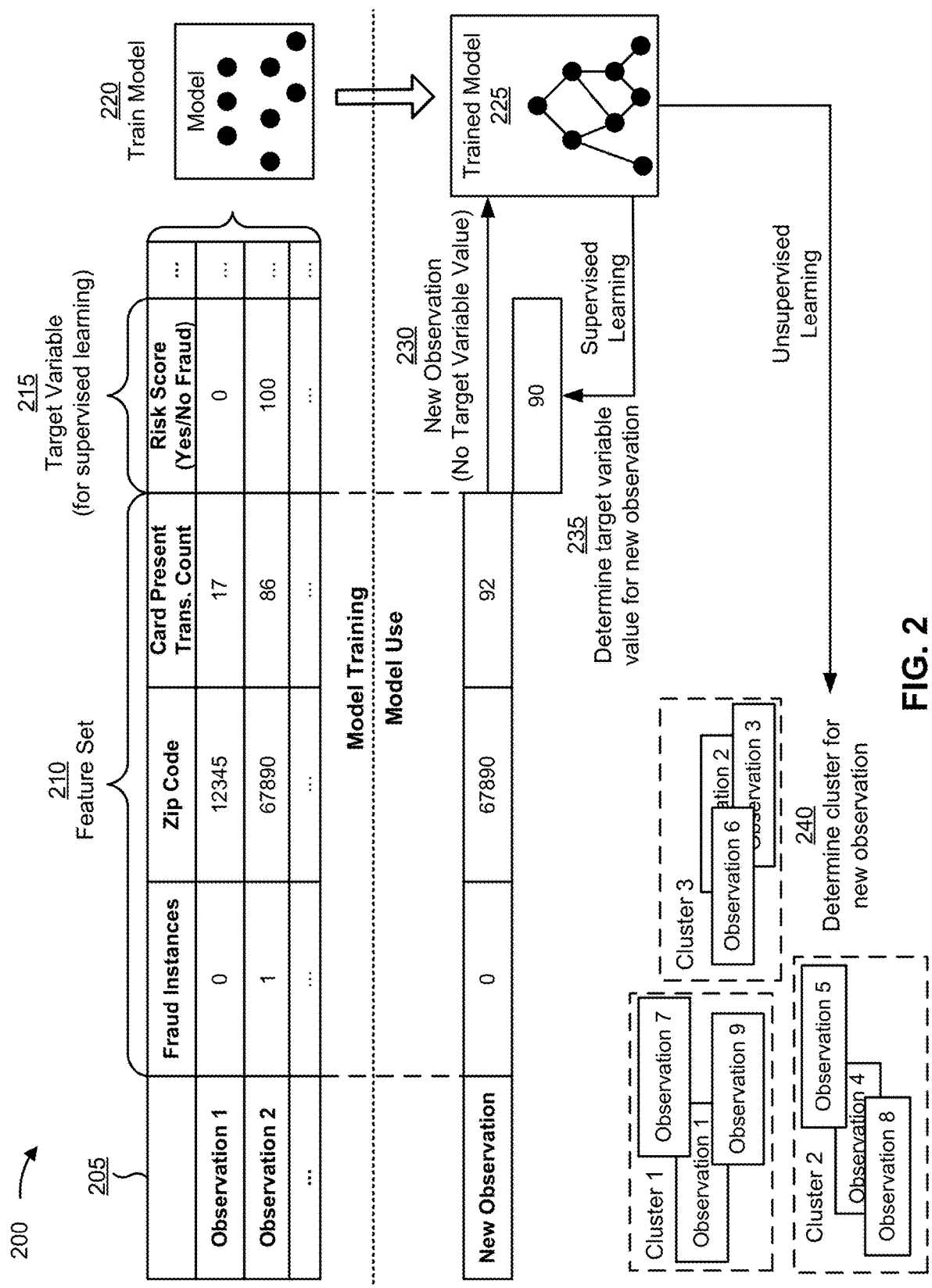
FIG. 2 is a diagram illustrating an example of training and using a machine learning model in connection with selectively printing symbolic information on a medium.

FIG. 2 is a diagram illustrating an example 200 of training and using a machine learning model in connection with selectively printing symbolic information on a medium. The machine learning model training and usage described herein may be performed using a machine learning system. The machine learning system may include or may be included in a computing device, a server, a cloud computing environment, and/or the like, such as a risk analysis device, a server device, and/or an application server, described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from a client device, data source(s), or a mobile device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the client device, the data source(s), or the mobile device. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a number of fraud instances, a second feature of a zip code, a third feature of a card-present transaction count (e.g., a number of transactions classified as card-present transactions), and so on. As shown, for a first observation, the first feature may have a value of "0," the second feature may have a value of "12345," the third feature may have a value of "17," and so on. These features and feature values are provided as examples, and may differ in other examples. For example, the feature set may include one or more of the following features: a credit score, a credit age, an amount of debt associated with other credit accounts, a number of other credit accounts currently open, an entity that closed previous credit accounts, a number of accounts opened with this institution, a type of merchant associated with previous transactions, a type of transaction associated with previous transactions (e.g., contactless, card-present, card-not-present, in-person, or online, among other examples), a type of item or service purchased in previous transactions, a type of fraud previously experienced, an address (e.g., street address, city, and/or state), a postal code, an IPS associated with a device used to submit a credit application, whether behavior information indicates fraud, and/or another risk factor described elsewhere herein. In some implementations, the machine learning model may use a first feature set for entities that have previously opened an account or that have an account with an institution associated with the machine learning model and a second feature set for entities that have not previously opened an account or that do not have an account with an institution associated with the machine learning model.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is a risk score (e.g., indicating a likelihood that an account identifier of an account associated with a transaction card will be stolen or obtained based on information on the transaction card), which has a value of "0" for the first observation (e.g., indicating a low risk).

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature value of zero fraud instances, a second feature value of a zip code of "67890," a third feature of a card-present transaction count of 92, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of 90 for the target variable of risk score for the new observation, as shown by reference number 235. Based on the predicted value satisfying a threshold, the machine learning system may transmit a second instruction, indicative of high risk, to a transaction card manufacturing system, as described elsewhere herein. As another example, if the machine learning system were to predict a value that does not satisfy the threshold (e.g., a value of 10 where the threshold is 50) for the target variable of risk score, then the machine learning system may transmit a first instruction, indicative of low risk, to a transaction card manufacturing system, as described elsewhere herein.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster indicating a high risk of fraud, then the machine learning system may transmit the second instruction, as described above. As another example, if the machine learning system were to classify the new observation in a second cluster indicating a low risk of fraud, then the machine learning system may transmit the first instruction, as described above.

In this way, the machine learning system may apply a rigorous and automated process to determine a likelihood that an entity may have account identifier information stolen or otherwise obtained from account identifier information that is included on the surface of a transaction card. The machine learning system enables recognition and/or identification of tens, hundreds, thousands, or millions of features and/or feature values for tens, hundreds, thousands, or millions of observations, thereby increasing accuracy and consistency and reducing delay associated with determining the likelihood that an entity may have account identifier information stolen or otherwise obtained from account identifier information that is included on the surface of a transaction card relative to requiring computing resources to be allocated for tens, hundreds, or thousands of operators to manually determine the likelihood that an entity may have account identifier information stolen or otherwise obtained from account identifier information that is included on the surface of a transaction card using the features or feature values.

As indicated above, FIG. 2 is provided as an example. Other examples may differ from what is described in connection with FIG. 2.

Figure 3:
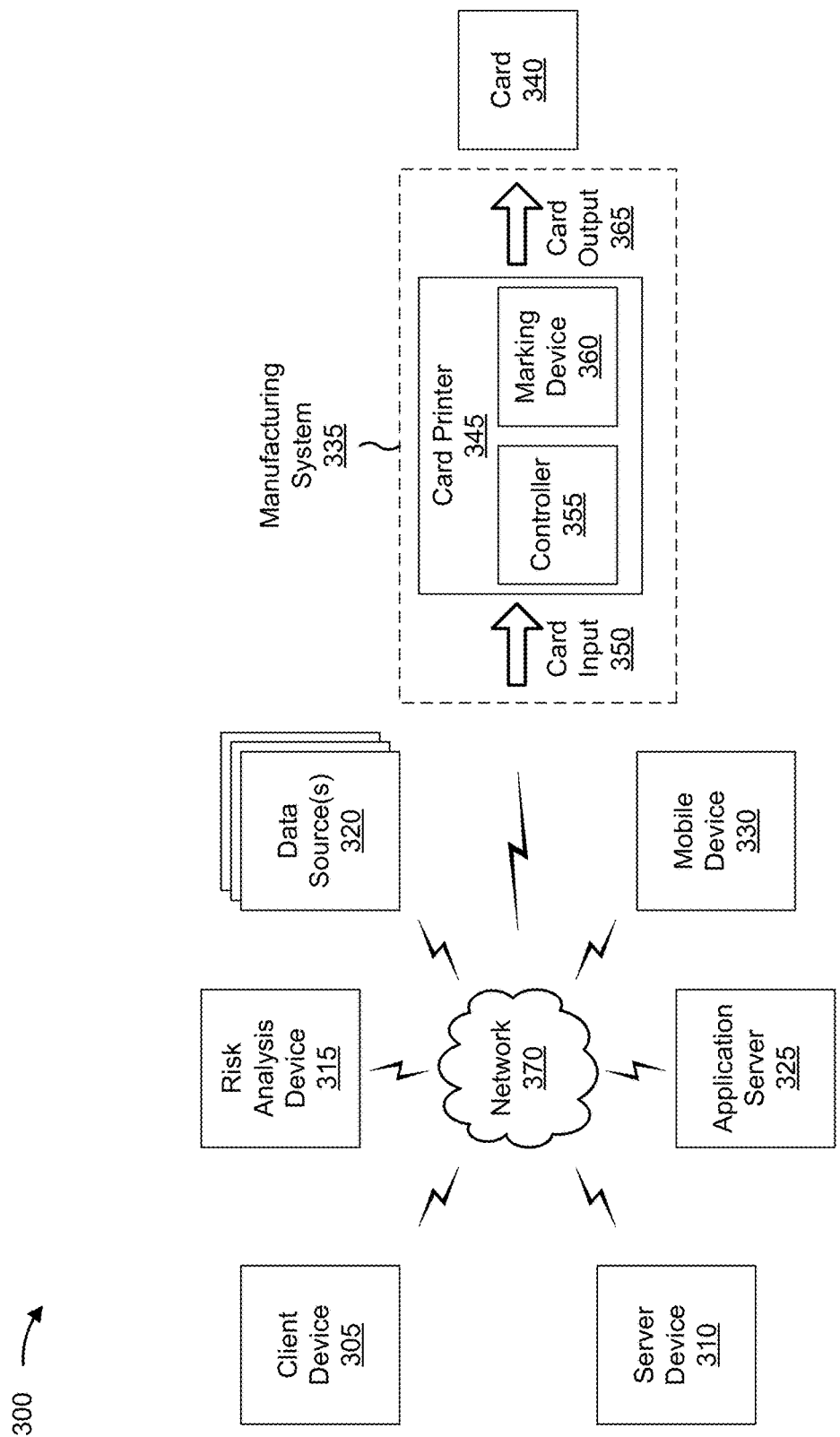
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a client device 305, a server device 310, a risk analysis device 315, one or more data sources 320, an application server 325, a mobile device 330, a manufacturing system 335 (e.g., that includes a card printer 345, a card input 350, a controller 355, a marking device 360, and a card output 365) for printing a card 340, and a network 370. Devices of environment 300 may interconnect via wired connections, wireless connections, or a combination of wired and wireless connections.

The client device 305 includes one or more devices capable of receiving, generating, storing, processing, and/or providing the application information described elsewhere herein. The client device 305 may include a communication device and/or a computing device. For example, the client device 305 may include a wireless communication device, a mobile phone (e.g., a smart phone or a cell phone), a laptop computer, a tablet computer, a desktop computer, or a similar type of device.

The server device 310 includes one or more devices capable of receiving, generating, storing, processing, providing, and/or routing the application information described elsewhere herein. For example, the server device 310 may serve, to the client device 305, one or more web pages that provide an application form to be filled out by a user via interaction with the client device 305. In this case, the server device 310 may receive application information from the client device 305, and may provide the application information to the risk analysis device 315. The server device 310 may include a communication device and/or a computing device. For example, the server device 310 may include a server, an application server, a web server, or a similar type of device.

The risk analysis device 315 includes one or more devices capable of determining a risk score and instructing the manufacturing system 335 to manufacture a card based on the risk score, as described elsewhere herein. The risk analysis device 315 may include a communication device and/or a computing device. For example, the risk analysis device 315 may include a server, a device in a cloud computing system, or a similar type of device. In some implementations, the risk analysis device 315 may be integrated into the manufacturing system 335.

The data source(s) 320 include one or more devices capable of receiving, generating, storing, processing, and/or providing information associated with a risk factor that may be used by the risk analysis device 315 to determine a risk score, as described elsewhere herein. A data source 320 may include a communication device and/or a computing device. For example, a data source 320 may include a database, a server, a device in a cloud computing system, or a similar type of device.

The application server 325 includes one or more devices capable of receiving, generating, storing, processing, providing, and/or routing information associated with an account application, as described elsewhere herein. For example, the application server 325 may host the account application. The application server 325 may include a communication device and/or a computing device. For example, the application server 325 may include a server, an application server, a web server, a device in a cloud computing system, or a similar type of device.

The mobile device 330 includes one or more devices capable of accessing an account application, as described elsewhere herein. The mobile device 330 may include a communication device and/or a computing device. For example, the mobile device 330 may include a wireless communication device, a user equipment (UE), a mobile phone (e.g., a smart phone or a cell phone, among other examples), a laptop computer, a tablet computer, a handheld computer, a desktop computer, a wearable communication device (e.g., a smart wristwatch or a pair of smart eyeglasses, among other examples), or a similar type of device.

The manufacturing system 335 includes one or more devices capable of manufacturing a card 340 (e.g., a transaction card) and/or printing information on the card 340, as described elsewhere herein. The card 340 may include a transaction card capable of storing data and/or communicating the data to facilitate a transaction. Card 340 may be capable of storing and/or communicating data for a point of sale (PoS) transaction with a transaction terminal. For example, card 340 may store or communicate data including account identifier information (e.g., an account identifier or a cardholder identifier), expiration information of card 340, banking information, and/or transaction information (e.g., a payment token), among other examples. In some implementations, card 340 may include one or more features and/or one or more components for storing and communicating the data, such as a string, an account number, a bar code, a magnetic strip, a quick response (QR) code, and/or an integrated circuit (IC) chip. For example, to store or communicate the data, card 340 may include a magnetic strip and/or an IC chip (e.g., a EUROPAY®, a MASTERCARD®, or a VISA® (EMV) chip).

The manufacturing system 335 may be a printing system and/or may include a card printer 345. The card printer 345 may be a device capable of manufacturing a card 340 using a medium (such as plastic, metal, or paper). For example, the card printer 345 may include a printer, a laser printer, an ink jet printer, a re-transfer printer, a laminator, and/or an embosser, among other examples. The manufacturing system 335 may include a card input 350 for inputting a medium into the card printer 345, such as an input feed. For example, the card input 350 may enable a blank card 340 (e.g., without account identifier information printed or included on the surface of the card 340) to be inputted into the card printer 345.

The card printer 345 may include a controller 355 and/or a marking device 360. The controller 355 may receive one or more instructions from one or more of the other devices of environment 300, such as risk analysis device 315. The controller 355 may control one or more devices of the manufacturing system 335, such as the marking device 360, to manufacture a card 340 according to the one or more instructions. The controller 355 may include a memory and/or one or more processors, as described in more detail below in connection with FIG. 4. The marking device 360 may include one or more devices capable of marking a medium of the card 340. The marking device 360 may include a laser assembly, a laser, a plate, a seal, an embossing seal, a stamp, an ink jet, a sintering device, a print head, a fuser, a belt, a roller, and/or an image drum, among other examples. The marking device 360 may be capable of manufacturing characters, symbols, digits, and/or other information on a medium of the card 340. The manufacturing system 335 may include a card output 365, such as an output feed, for outputting a manufactured card 340. For example, the card output 365 may enable a completed card 340 to be removed from the manufacturing system 335.

The network 370 includes one or more wired and/or wireless networks. For example, the network 370 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, the Internet, and/or a combination of these or other types of networks. The network 370 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
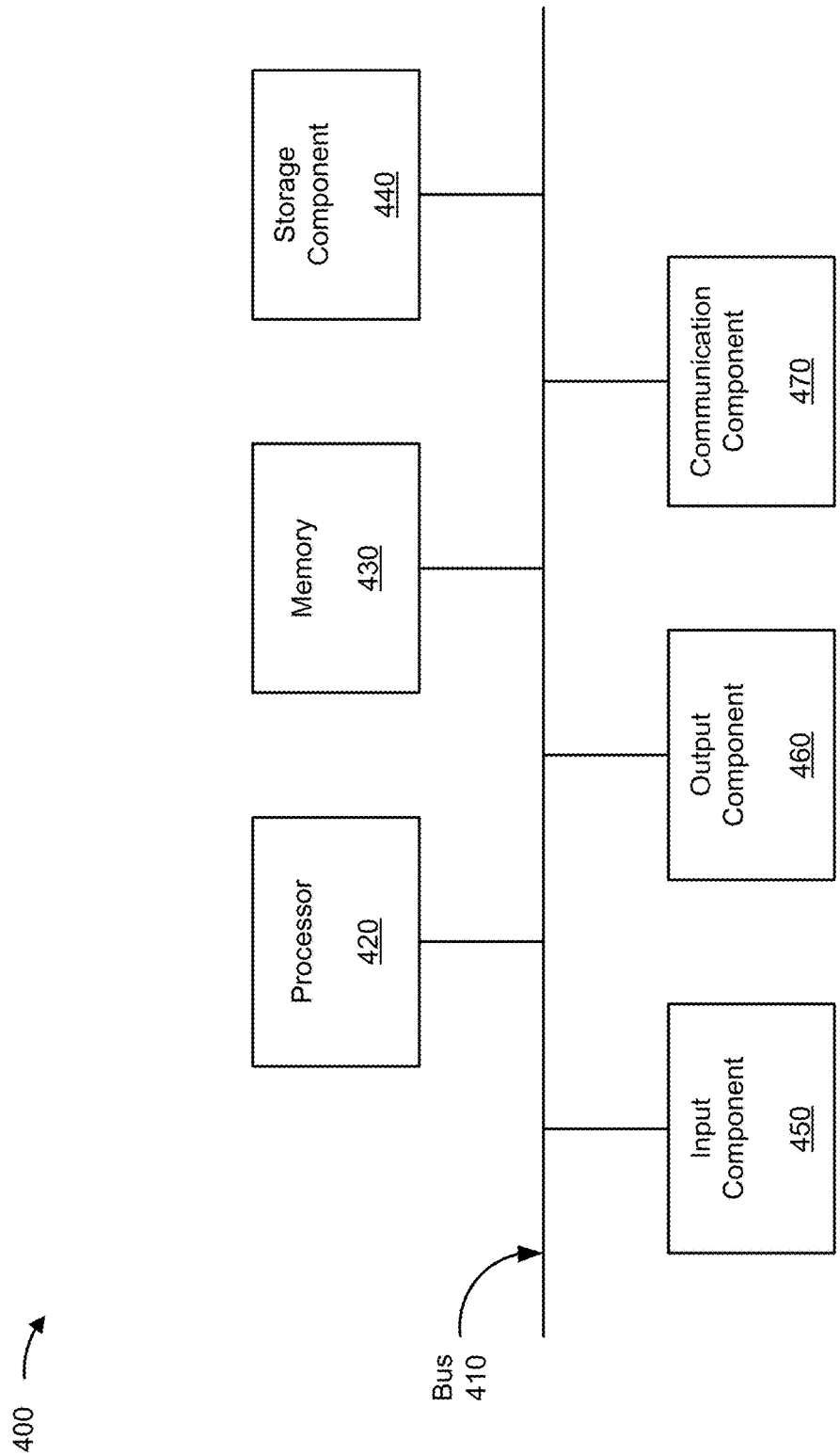
FIG. 4 is a diagram of example components of one or more devices of FIG. 3.

FIG. 4 is a diagram of example components of a device 400, which may correspond to the client device 305, the server device 310, the risk analysis device 315, the data source(s) 320, the application server 325, the mobile device 330, the manufacturing system 335, and/or the controller 355. In some implementations, the client device 305, the server device 310, the risk analysis device 315, the data source(s) 320, the application server 325, the mobile device 330, the manufacturing system 335, and/or the controller 355 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with selectively printing symbolic information on a medium. In some implementations, one or more process blocks of FIG. 5 may be performed by a risk analysis device (e.g., risk analysis device 315). In some implementations, one or more process blocks of FIG. 5 may be performed by another device or a group of devices separate from or including the risk analysis device, such as the manufacturing system 335. Additionally, or alternatively, one or more process blocks of FIG. 5 may be performed by one or more components of the manufacturing system 335 and/or the device 400, such as card printer 345, controller 355, marking device 360, processor 420, memory 430, storage component 440, input component 450, output component 460, and/or communication component 470.

As shown in FIG. 5, process 500 may include receiving application information associated with applying for a transaction card (block 510). As further shown in FIG. 5, process 500 may include calculating a risk score based on a plurality of factors included in or derived from the application information (block 520). In some implementations, the risk score indicates a risk that an account identifier associated with the transaction card will be stolen. As further shown in FIG. 5, process 500 may include determining whether the risk score satisfies a threshold (block 530).

As further shown in FIG. 5, if the risk score does not satisfy the threshold (block 530—NO), then process 500 may include transmitting a first instruction to a transaction card manufacturing system (block 540). The first instruction may instruct the transaction card manufacturing system (e.g., manufacturing system 335) to manufacture the transaction card in a first manner (e.g., using a first manufacturing technique or a first combination of manufacturing techniques). As further shown in FIG. 5, if the risk score satisfies the threshold (block 530—YES), then process 500 may include transmitting a second instruction to a transaction card manufacturing system (block 550). The second instruction may instruct the transaction card manufacturing system (e.g., manufacturing system 335) to manufacture the transaction card in a second manner (e.g., using a second manufacturing technique or a second combination of manufacturing techniques).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A printing system, comprising:
a device configured to:
determine a score associated with an account identifier to be printed on a card,
wherein the score is determined based on risk factors associated with a likelihood that the account identifier will be used for a fraudulent transaction;
determine to print the card with a full account identifier or a partial account identifier based on the score,
wherein the device, to determine to print the card with the full account identifier or the partial account identifier, is configured to:
determine a first printing method associated with the full account identifier, and
determine a second printing method associated with the partial account identifier; and
transmit either a first printing instruction to print the card with the full account identifier using the first printing method or a second printing instruction to print the card with the partial account identifier using the second printing method based on a determination of whether the score satisfies a threshold; and
a card printer that includes a printing controller and a marking device, wherein the card printer is configured to:
receive, by the printing controller and from the device, the first printing instruction or the second printing instruction associated with printing the account identifier on the card,
wherein the card printer is configured to print the full account identifier, associated with the card, on a surface of the card based on receiving the first printing instruction,
wherein the card printer is configured to print the card with the partial account identifier on the surface of the card based on receiving the second printing instruction,
wherein the card printer, when printing the card with the partial account identifier, is configured to print the card with a portion of the full account identifier based on receiving the second printing instruction, and
wherein one of the first printing instruction or the second printing instruction is received based on whether the score satisfies the threshold; and
print, using the marking device, the card with the full account identifier or with the partial account identifier based on whether the first printing instruction or the second printing instruction is received by the printing controller,
wherein the marking device, to print the card is configured with the full account identifier to use the first printing method to print the full account identifier based on the first printing instruction, or
wherein the marking device, to print the card with the partial account identifier, is configured to use the second printing method to print the partial account identifier based on the second printing instruction.

2. The printing system of claim 1, wherein the score indicates a risk that the account identifier will be stolen or used in an unauthorized transaction.

3. The printing system of claim 1, wherein the score is determined based on credit application information associated with applying for the card, and wherein the account identifier is associated with an account generated based on the credit application information.

4. The printing system of claim 1, wherein the second printing instruction further indicates a set of characters to be printed on the surface of the card in place of all or the portion of the full account identifier.

5. A method, comprising:
receiving, by a device, credit application information associated with applying for a transaction card;
determining, by the device, a risk score based on the credit application information, wherein the risk score indicates a risk that an account identifier associated with the transaction card will be stolen;
determining, by the device, to print the transaction card with a full account identifier or a partial account identifier based on the risk score,
wherein determining to print the transaction card with the full account identifier or the partial account identifier comprises:
determining a first printing method associated with the full account identifier, and
determining a second printing method associated with the partial account identifier; and
transmitting, by the device, either a first instruction to print the transaction card with the full account identifier using the first printing method or a second instruction to print the transaction card with the partial account identifier using the second printing method to a transaction card printing system based on a determination of whether the risk score satisfies a threshold,
wherein the first instruction instructs the transaction card printing system to print the full account identifier, associated with the transaction card, on a surface of the transaction card,
wherein printing the full account identifier comprises embossing, layering, or laminating the full account identifier, and
wherein the second instruction instructs the transaction card printing system to print the transaction card with the partial account identifier on the surface of the transaction card using the first printing method,
wherein printing with the partial account identifier comprises embossing, layering, or laminating the partial account identifier using the second printing method,
wherein printing with the partial account identifier comprises printing the transaction card with a portion of the full account identifier based on receiving the second instruction.

6. The method of claim 5, wherein the risk score is determined based on at least one of a fraud history or a credit history associated with an entity applying for the transaction card.

7. The method of claim 5, wherein the risk score is determined based on a transaction history associated with an entity applying for the transaction card, wherein the transaction history indicates at least one of:
a set of merchants with which transactions were made,
a set of items purchased in one or more transactions, or
an indication of whether a card was present or not present for one or more transactions.

8. The method of claim 5, wherein the risk score is determined based on a geographic region included in the credit application information, associated with an entity applying for the transaction card, or associated with a network address of a device used to apply for the transaction card.

9. The method of claim 5, further comprising:
determining, based on the credit application information, whether an entity applying for the transaction card has an account with an institution associated with the transaction card;
applying either a first model or a second model to the credit application information based on whether the entity applying for the transaction card has an account with the institution; and
determining the risk score based on applying either the first model or the second model.

10. The method of claim 5, wherein either the first instruction or the second instruction is transmitted further based on whether an entity applying for the transaction card provides input indicating whether the transaction card is to be printed using the full account identifier.

11. The method of claim 5, wherein the second instruction further indicates a set of characters to be printed on the surface of the transaction card in place of all or the portion of the full account identifier.

12. The method of claim 11, wherein at least one character, of the set of characters, is based on input provided by an entity applying for the transaction card.

13. The method of claim 5, further comprising transmitting a message to assist an entity applying for the transaction card with enrolling in a program that enables the entity to access the full account identifier using a mobile device.

14. A non-transitory computer-readable medium storing a set of instructions, the set of instructions comprising:
one or more instructions that, when executed by one or more processors of a device, cause the device to:
receive application information associated with applying for a transaction card;
calculate a risk score based on a plurality of factors included in or derived from the application information, wherein the risk score indicates a likelihood that an account identifier of an account associated with the transaction card will be used for a fraudulent transaction;
determine whether the risk score satisfies a threshold;
determine to manufacture the transaction card with a full account identifier or a partial account identifier based on the risk score,
wherein the one or more instructions, that cause the device to determine to manufacture the transaction card with the full account identifier or the partial account identifier, cause the device to:
determine a first manner to manufacture the transaction card associated with the full account identifier, and
determine a second manner to manufacture the transaction card associated with the partial account identifier; and
transmit one of a first instruction or a second instruction to a transaction card manufacturing system based on whether the risk score satisfies the threshold,
wherein the first instruction instructs the transaction card manufacturing system to manufacture the transaction card in the first manner,
wherein the transaction card manufacturing system, to manufacture the transaction card in the first manner, is to print, emboss, layer, or laminate,
wherein the transaction card manufacturing system, to manufacture the transaction card in the first manner, is configured to print the full account identifier, associated with the transaction card, on a surface of the transaction card based on receiving the first instruction, and
wherein the second instruction instructs the transaction card manufacturing system to manufacture the transaction card in the second manner, wherein the second manner is different from the first manner,
wherein the transaction card manufacturing system, to manufacture the transaction card in the second manner, is configured to print the transaction card with a portion of the full account identifier based on receiving the second instruction.

15. The non-transitory computer-readable medium of claim 14, wherein the first instruction instructs the transaction card manufacturing system to print a full card verification value or a full expiration date, associated with the transaction card, on the surface of the transaction card, and
wherein the second instruction instructs the transaction card manufacturing system to print the transaction card without the full card verification value or without the full expiration date on the surface of the transaction card.

16. The non-transitory computer-readable medium of claim 14, wherein the first instruction instructs the transaction card manufacturing system to manufacture the surface of the transaction card using a first manufacturing technique, and
wherein the second instruction instructs the transaction card manufacturing system to manufacture the surface of the transaction card using a second manufacturing technique that is different from the first manufacturing technique.

17. The non-transitory computer-readable medium of claim 16, wherein the second manufacturing technique includes at least one of:
using a smaller character size than the first manufacturing technique,
using a reflective ink or marking, or
using a lower contrast level than the first manufacturing technique.

18. The non-transitory computer-readable medium of claim 14, wherein the risk score is determined based on behavior information that indicates user behavior associated with inputting the application information into an application form using a client device.

19. The non-transitory computer-readable medium of claim 14, wherein the risk score is determined based on at least one of a fraud history, a credit history, a transaction history, or a geographic region associated with an entity applying for the transaction card.

20. The non-transitory computer-readable medium of claim 14, wherein the second instruction further indicates a set of characters to be printed on the surface of the transaction card in place of all or the portion of the full account identifier.

* * * * *